United States Patent [19]

Coffey

[11] 4,376,622
[45] Mar. 15, 1983

[54] MOLD OPENING AND HANDLING APPARATUS

[75] Inventor: Theodore E. Coffey, Pennsauken, N.J.

[73] Assignee: Meat Management, Inc., Pennsauken, N.J.

[21] Appl. No.: 201,869

[22] Filed: Oct. 31, 1980

[51] Int. Cl.³ .......................... B29C 1/16; B29C 7/00
[52] U.S. Cl. .................................. 425/139; 249/121; 425/437; 425/450.1; 425/451.9
[58] Field of Search .................. 425/139, 450.1, 451.9, 425/437; 249/121

[56] References Cited

U.S. PATENT DOCUMENTS

| | | |
|---|---|---|
| 1,527,674 | 2/1925 | Davis . |
| 1,779,546 | 10/1930 | Jordan . |
| 2,310,956 | 2/1943 | Hoy . |
| 2,984,176 | 5/1961 | Sommer ...................... 425/451.9 X |
| 3,193,915 | 7/1965 | Gillie ................................ 29/239 |
| 3,195,186 | 7/1965 | Gauban ..................... 425/450.1 X |
| 3,323,173 | 6/1967 | Poyner ....................... 425/451.9 X |
| 3,776,675 | 12/1973 | Veneria .............................. 425/139 |

Primary Examiner—Thomas P. Pavelko
Attorney, Agent, or Firm—Lerner, David, Littenberg & Samuel

[57] ABSTRACT

Disclosed herein are a method and apparatus for opening molds by automatically unlocking a pair of locking mechanisms which cooperate to lock a pair of mold sections together. There are also disclosed herein a method and apparatus for handling a removed mold section and an article ejected from another mold section.

11 Claims, 13 Drawing Figures

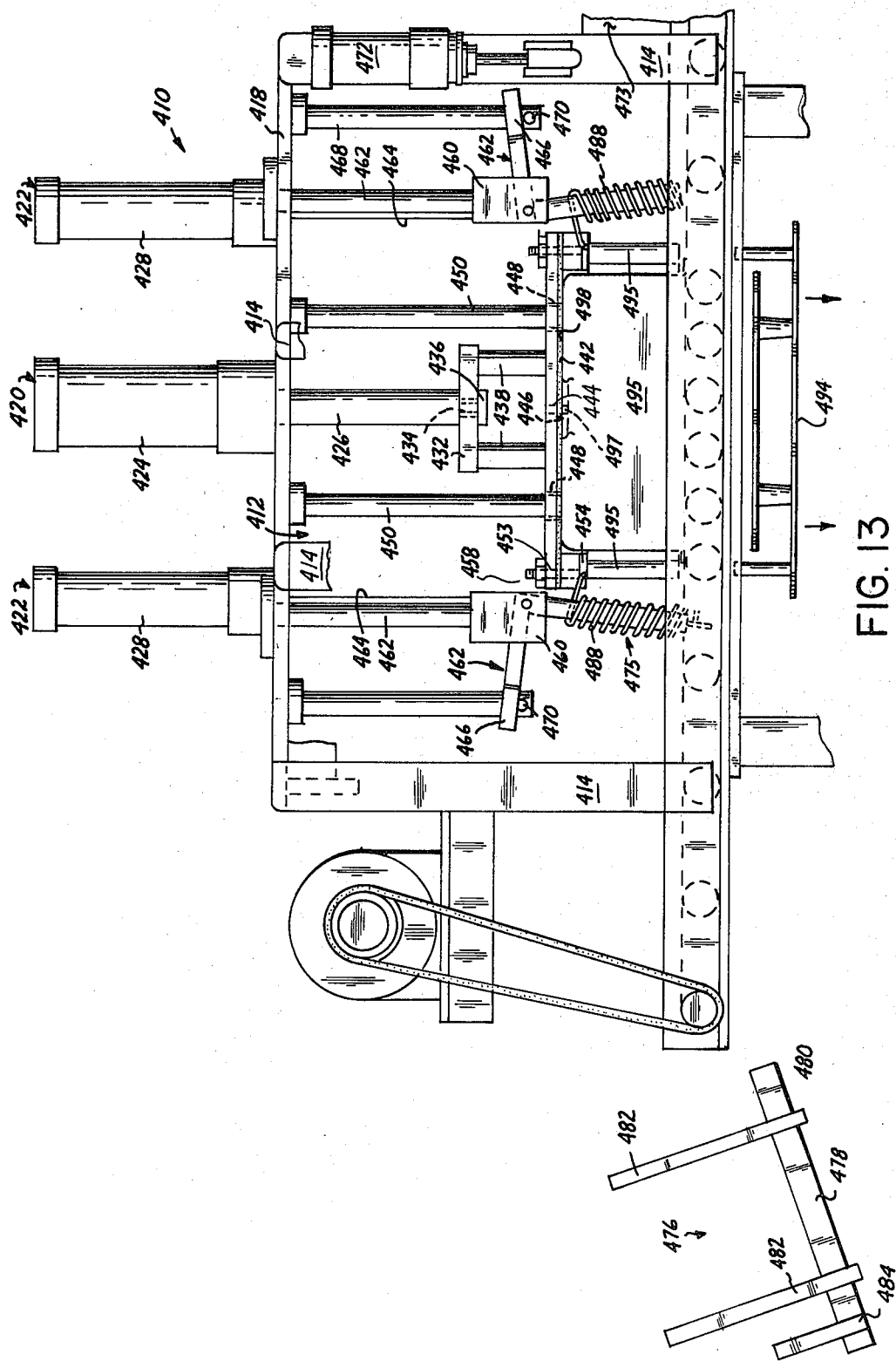

MOLD OPENING AND HANDLING APPARATUS

FIELD OF THE INVENTION

The present invention relates to mold opening and handling methods and apparatus, and, more particularly, to such methods and apparatus which are especially adapted to open and handle Adelman-type or Hoy-type molds.

BACKGROUND OF THE INVENTION

Adelman-type and Hoy-type molds are well known in the food-processing industry. Both types of molds include a pair of individually operable locking mechanisms, each of which must be unlocked in order to open the mold and remove an article, such as a processed piece of meat, therefrom.

More particularly, the Adelman-type molds include a body section and a closure section. The body section has an open end and a curled rim. The closure section includes a lid adapted to be removably applied to the open end of the body section, a bracket which is resiliently urged away from the lid by a pair of springs, and a pair of ratchets, each of which is hingedly connected to the bracket so as to releasably engage the curled rim of the body section.

The Hoy-type molds, like the Adelman-type molds, employ a body section and a closure section. However, the body section is attached to the closure section by a pair of removable springs, rather than by a pair of releasable ratchets.

Although automated mold opening devices have been known for many years (see, for instance, Davis U.S. Pat. No. 1,527,674; Leopold, Jr. U.S. Pat. No. 1,853,130; Goebel U.S. Pat. Nos. 1,891,976 and 1,934,188; Collins et al. U.S. Pat. No. 2,718,030; Millhoff U.S. Pat. No. 2,958,897; and Borah U.S. Pat. No. 2,983,953), none of these automated devices is adapted to open molds, such as the Adelman-type and Hoy-type molds, which are equipped with a pair of individually operable locking mechanisms. Accordingly, in the past, manual or semi-automatic techniques have been used to open such One known prior art technique for opening the Adelman-type molds involves moving a mold engaging plate, which is carried by a pneumatically operated plunger, into contact with an upwardly facing bottom surface of a body section of an inverted mold. When the mold engaging plate contacts the bottom surface of the body section of the mold, a lever, which is also carried by the plunger, cooperates with a hand tool to disengage one of the ratchets from the rim of the body section. The other ratchet must be manually disengaged from the rim of the body section. Upon the removal of the closure section from the body section, a blast of air is employed to eject the molded product from the body section of the mold. The closure section and the molded product must then be manually transported away from the mold opening and emptying station.

Techniques have also been developed to automate the handling of an open mold and its contents (see, for instance, Schulze U.S. Pat. No. 1,938,048). However, these prior art techniques are not suitable for use in connection with Adelman-type and Hoy-type molds.

SUMMARY OF THE INVENTION

Many of the disadvantages and shortcomings of the prior art are overcome in accordance with the present invention by automatically opening a pair of locking mechanisms which cooperate to lock a first mold section to a second mold section. The automatic opening of the locking mechanisms simplifies and expedites the opening of a mold formed by the first mold section and the second mold section.

In accordance with one embodiment of the present invention, an Adelman-type mold is delivered upside down to a mold opening and emptying station, i.e., with its closure section facing downward and its body section facing upward. When the mold is properly positioned at the opening and emptying station, a mold engaging plate, carried by and movable relative to a piston rod of a first pneumatically operated ram, is moved downward by the piston rod until the mold engaging plate contacts an upwardly facing bottom surface of the body section of the mold. The mold engaging plate remains in contact with the bottom surface of the mold during the continued downward movement of the piston rod of the first pneumatic ram. When the mold engaging plate is in contact with the bottom surface of the body section of the mold, piston rods of second and third pneumatically operated rams, which are carried by a pivotable catcher positioned below the opening and emptying station and constituting a separate aspect of the present invention, extend upwardly to compress springs mounted so as to urge a lid of the closure section into a cavity formed in the body section. While the springs are in a compressed state, the piston rod of the first pneumatic ram continues downward so that a pair of release arms pivotally mounted relative to the mold engaging plate can be cammed outwardly to disengage a pair of ratchets, which lock the closure section to the body section, from a curled rim of the body section. Upon retraction of the piston rods of the second and third pneumatic rams and the further extension of the piston rod of the first pneumatic ram, the release arms push the closure section away from the body section until the closure section falls into a first compartment of the catcher, which thereafter pivots in a first direction to eject the closure section and place a second compartment directly below the mold opening and emptying station. Thereafter, air is injected into a hole provided in the bottom surface of the body section to eject a molded product contained in the body section of the mold. The ejected product falls into the second compartment of the catcher, which is then pivoted in a second direction opposite to the first direction, thereby causing ejection of the product and repositioning of the first compartment directly below the mold opening and emptying station.

Another embodiment of the present invention is specifically adapted to open and empty Hoy-type molds. In this embodiment, a Hoy-type mold is delivered upside down to a mold opening and emptying station, i.e., with its closure section facing downward and its body section facing upward. When the mold is properly positioned at the opening and emptying station, piston rods of first and second pneumatic rams are extended downwardly. Pivotable spring stretchers move conjointly with the piston rods of the first and second pneumatic rams. After their insertion into a pair of springs which releasably lock the closure section to the body section, the spring stretchers are pivoted to pivot the springs out of engagement with the closure section. With the springs disengaged from the closure section, a piston rod of a third pneumatic ram moves a mold engaging plate toward an upwardly facing bottom surface of the body section. Pins carried by the mold engaging plate push the closure section away from the body section, causing the closure section to fall into a first compartment of a pivotable catcher, which, as indicated above, constitutes a separate aspect of the present invention. Thereafter, the catcher pivots in a first rotational direction to eject the closure section and place a second compartment directly below the mold opening and emptying station. After the mold engaging plate contacts the bottom surface of the body section, air is ejected into a hole provided in the bottom surface of the body section to eject a molded product contained in the body section of the mold. The ejected product falls into the second compartment of the catcher, which is then pivoted in a second direction opposite to the first direction, thereby causing ejection of the product and repositioning of the first compartment directly below the mold opening and emptying station.

BRIEF DESCRIPTION OF THE DRAWINGS

For a more complete understanding of the present invention, reference may be had to the following description of two exemplary embodiments, taken in conjunction with the accompanying figures of the drawings, in which:

FIG. 13 is a side elevational view of the mold opening mechanism of FIG. 10, the mold opening mechanism being shown partly broken away and at a different operating stage from the operating stages illustrated in FIGS. 10 and 12.

DESCRIPTION OF THE EXEMPLARY EMBODIMENTS

While the present invention may be employed to open any type of mold having a plurality of locking mechanisms operating to releasably attach one mold section to another mold section, it is especially suitable for use in connection with Adelman-type and Hoy-type molds. Thus, the present invention will be described with particular reference to Adelman-type and Hoy-type molds.

A. Adelman-Type Molds

Figure 1:
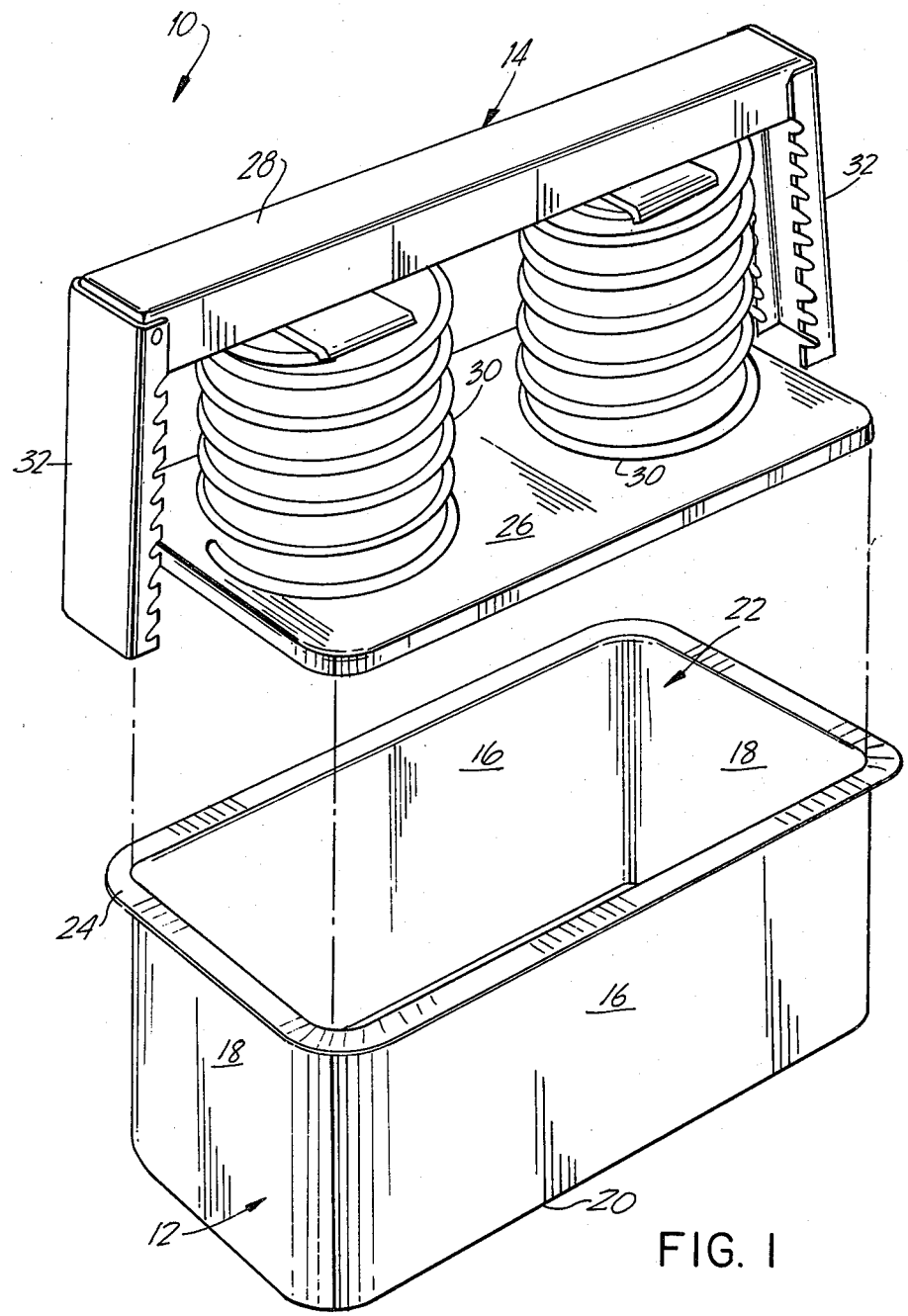
FIG. 1 is an exploded perspective view of an Adelman-type mold.

Referring to FIG. 1, there is shown an Adelman-type mold 10 which includes a body section 12 and a closure section 14. The body section 12 has a pair of side walls 16 and a pair of end walls 18. A bottom wall 20 cooperates with the side walls 16 and the end walls 18 to form a cavity 22 which is adapted to receive a product, such as a piece of ham, to be processed. The ends of the side walls 16 and end walls 18 remote from the bottom wall 20 terminate in a continuous curled rim 24. A hole (not shown) in the bottom wall 20 communicates with the cavity 22.

The closure section 14 includes a lid 26 and a bracket 28 attached to the lid 26 by a pair of coil springs 30. Ratchets 32 are pivotally attached to the bracket 28 so as to releasably engage the rim 24 of the body section 12. The lid 26 is sized and shaped so that it fits within the cavity 22 of the body section 12.

B. Hoy-Type Molds

Figure 2:
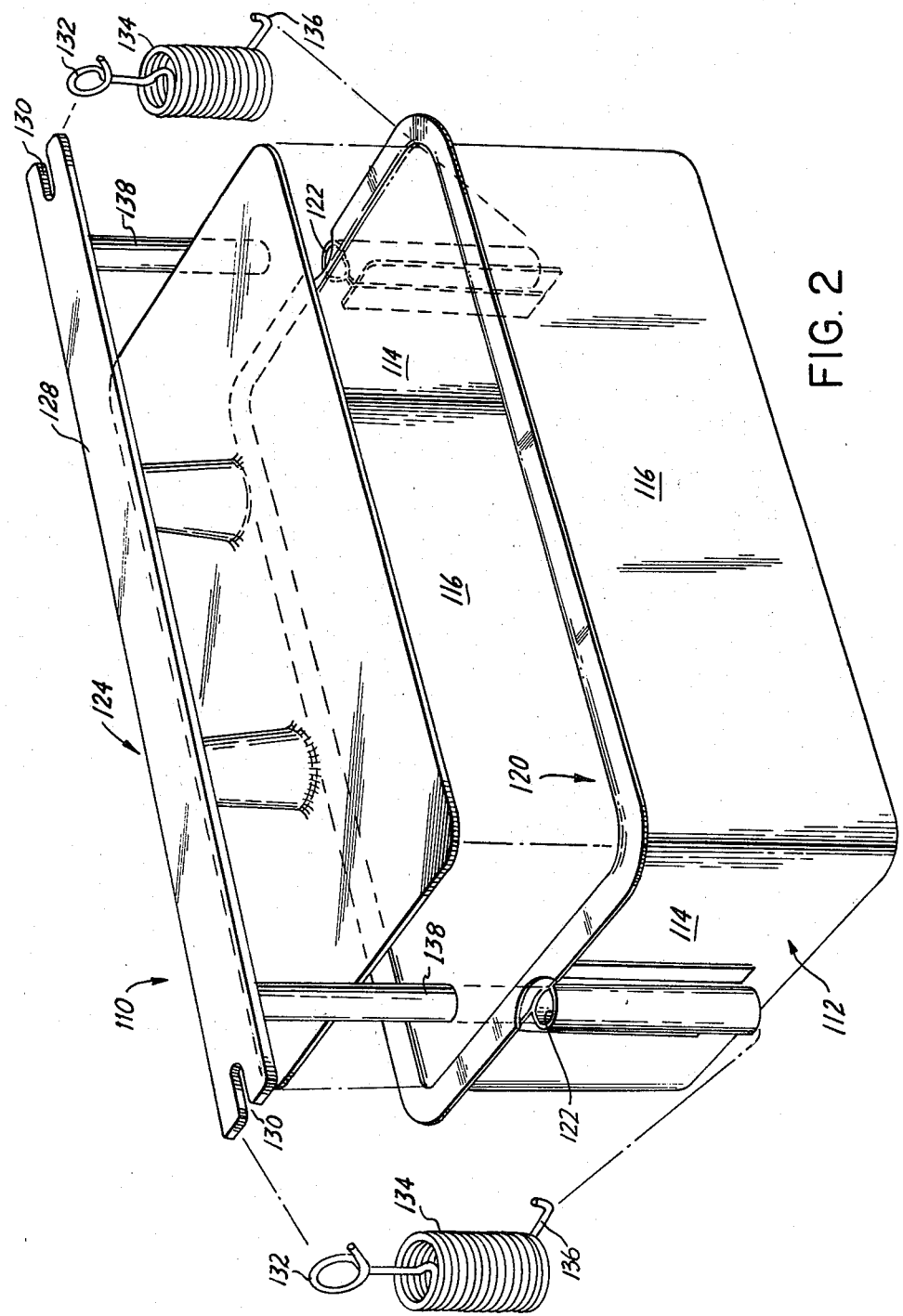
FIG. 2 is an exploded perspective view of a Hoy-type mold.
Figure 3:
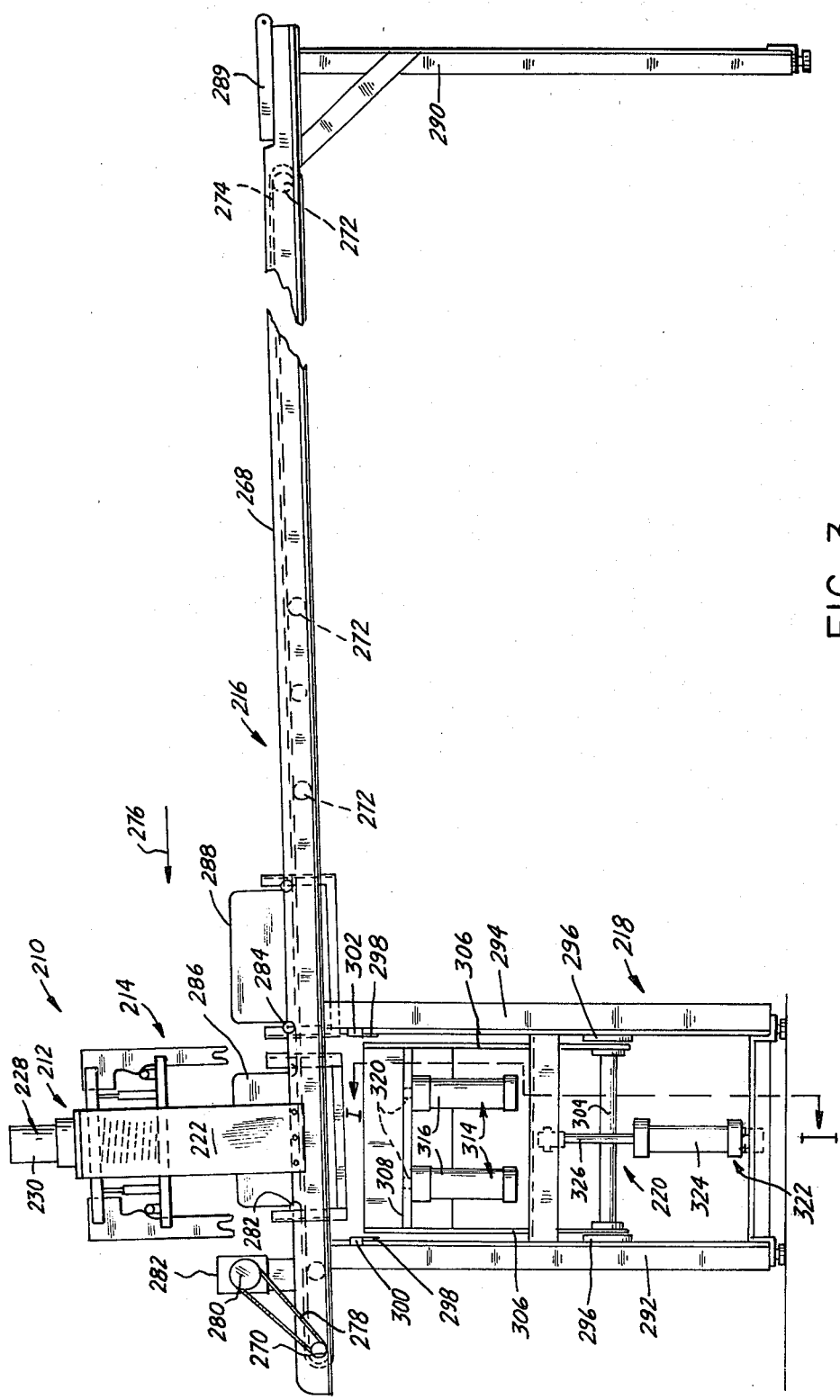
FIG. 3 is a side elevational view of one embodiment of a mold opening apparatus constructed in accordance with the present invention, the apparatus being designed to open Adelman-type molds.
Figure 4:
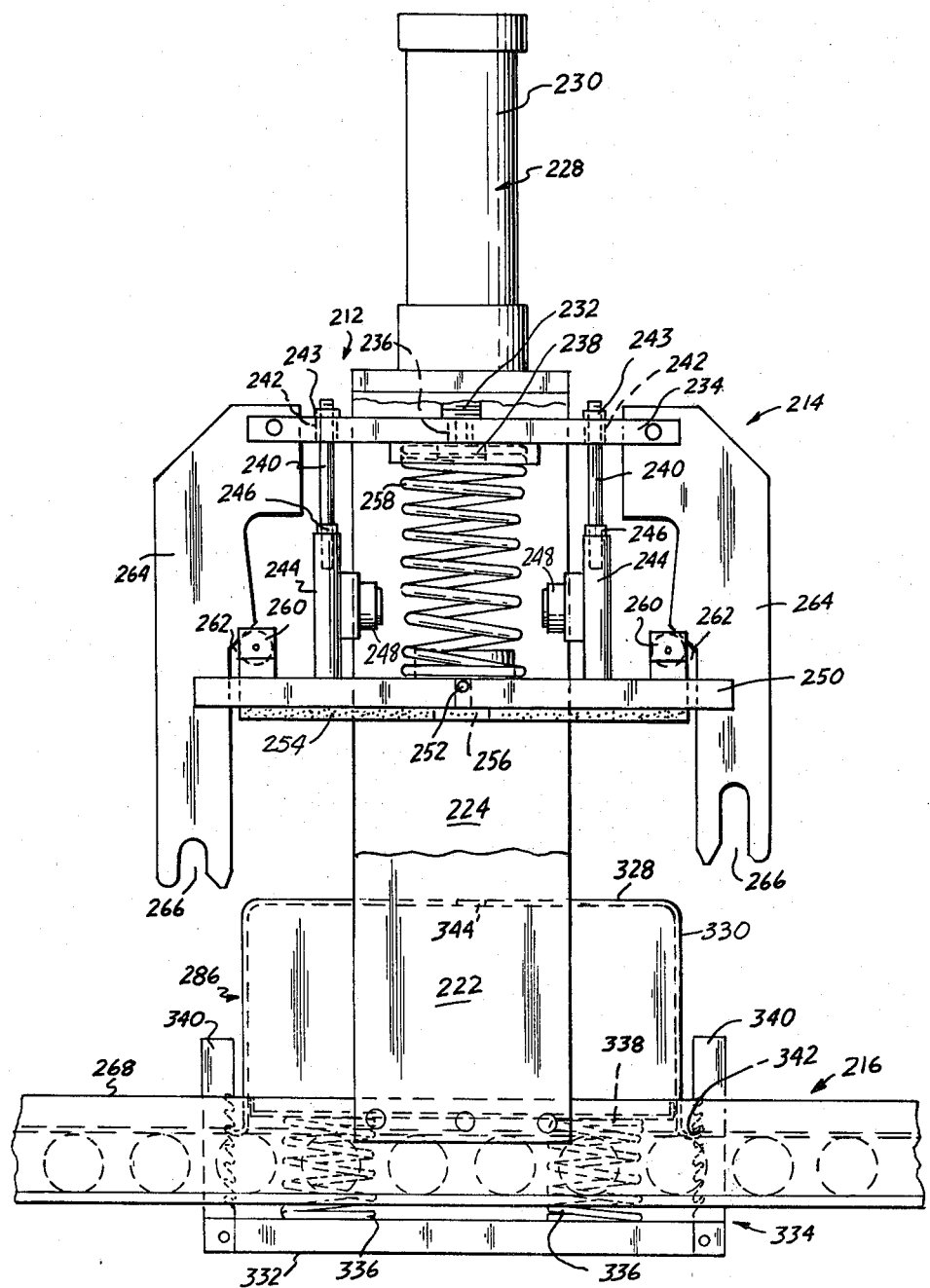
FIG. 4 is a side elevational view showing a mold opening mechanism of the apparatus of FIG. 3, a portion of the mold opening mechanism being broken away to facilitate consideration and discussion.
Figure 5:
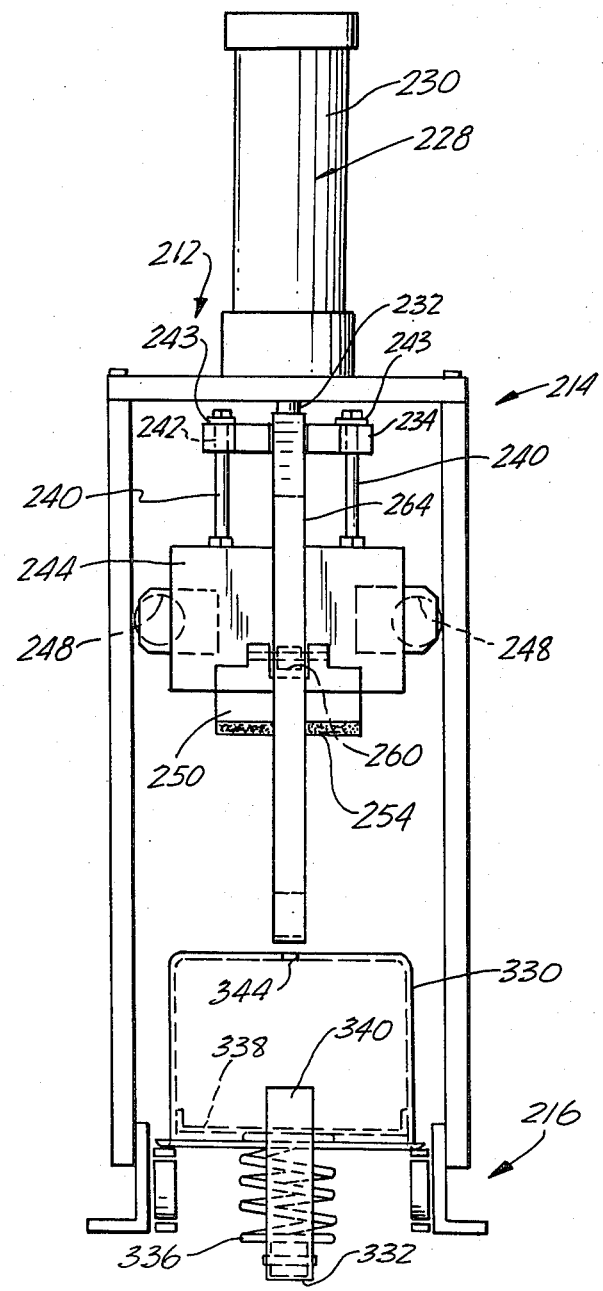
FIG. 5 is a rear elevational view of the mold opening mechanism illustrated in FIG. 4, a portion of the mold opening mechanism being broken away to facilitate consideration and discussion.
Figure 6:
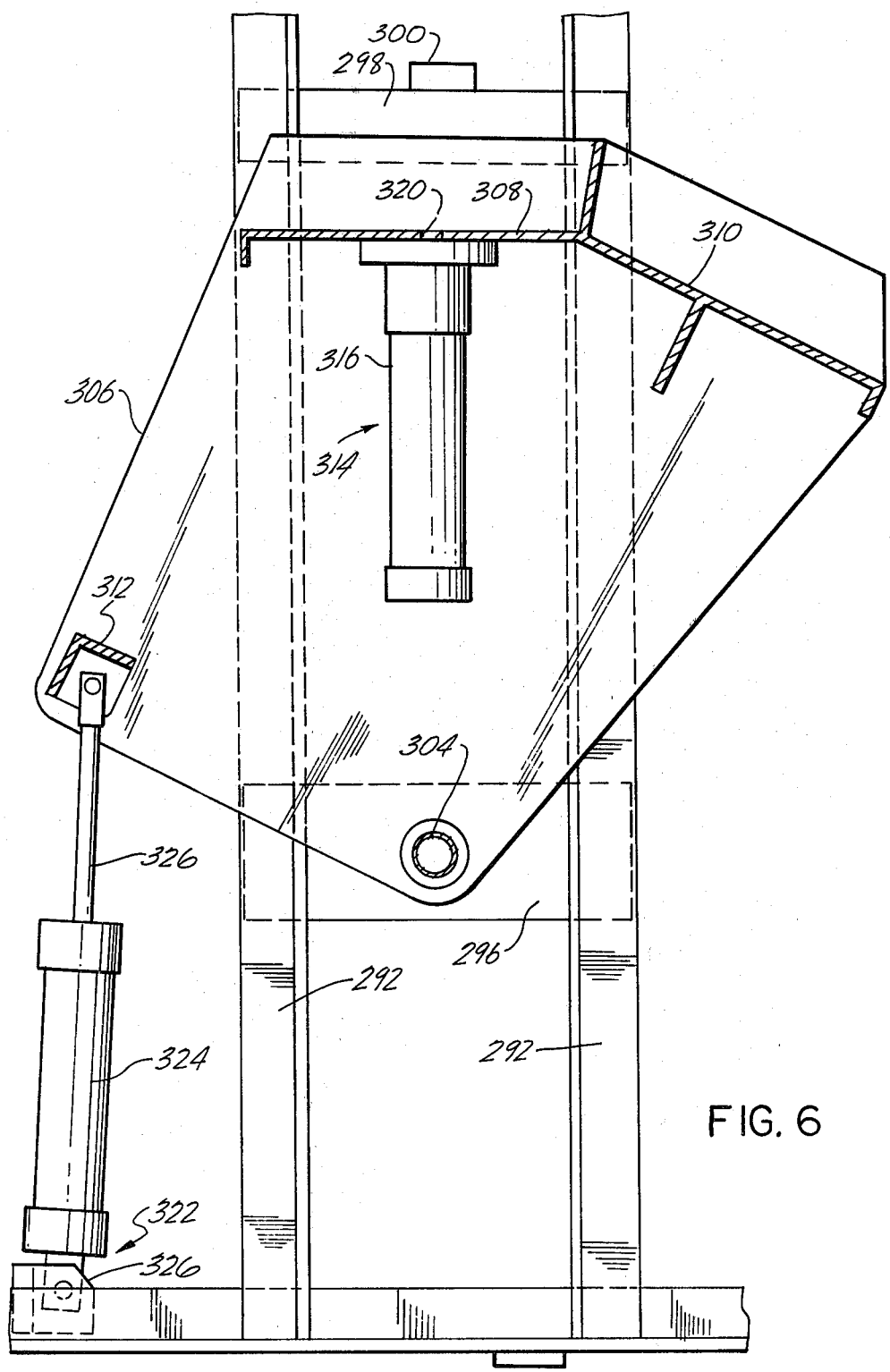
FIG. 6 is a cross-sectional view, taken along line I—I in FIG. 3 and looking in the direction of the arrows, of a lid and product ejector gate employed by the apparatus of FIG. 3, the ejector gate being shown in a lid-receiving position.
Figure 7:
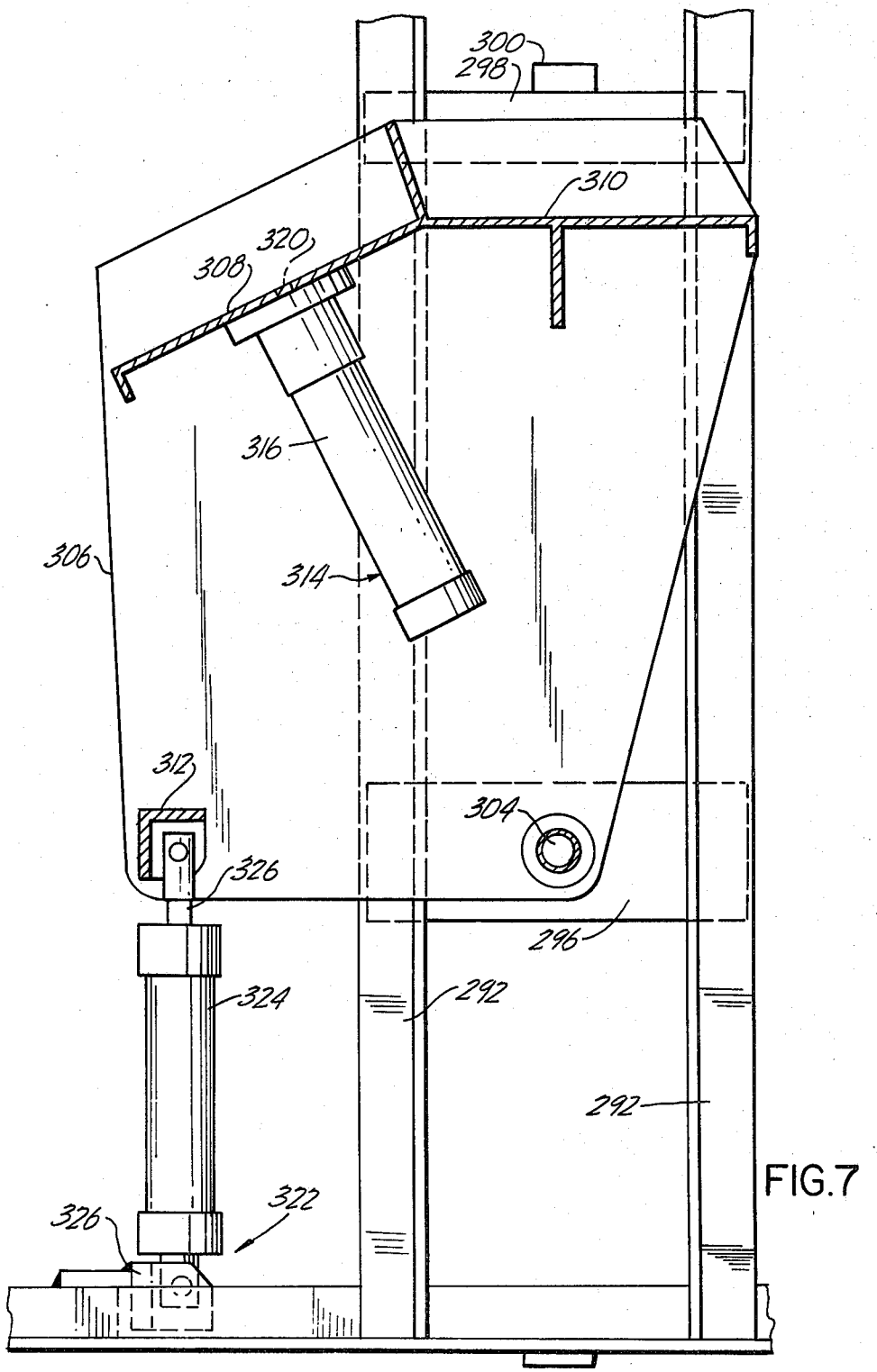
FIG. 7 shows the ejector gate of FIG. 6 in a product-receiving position.
Figure 8:
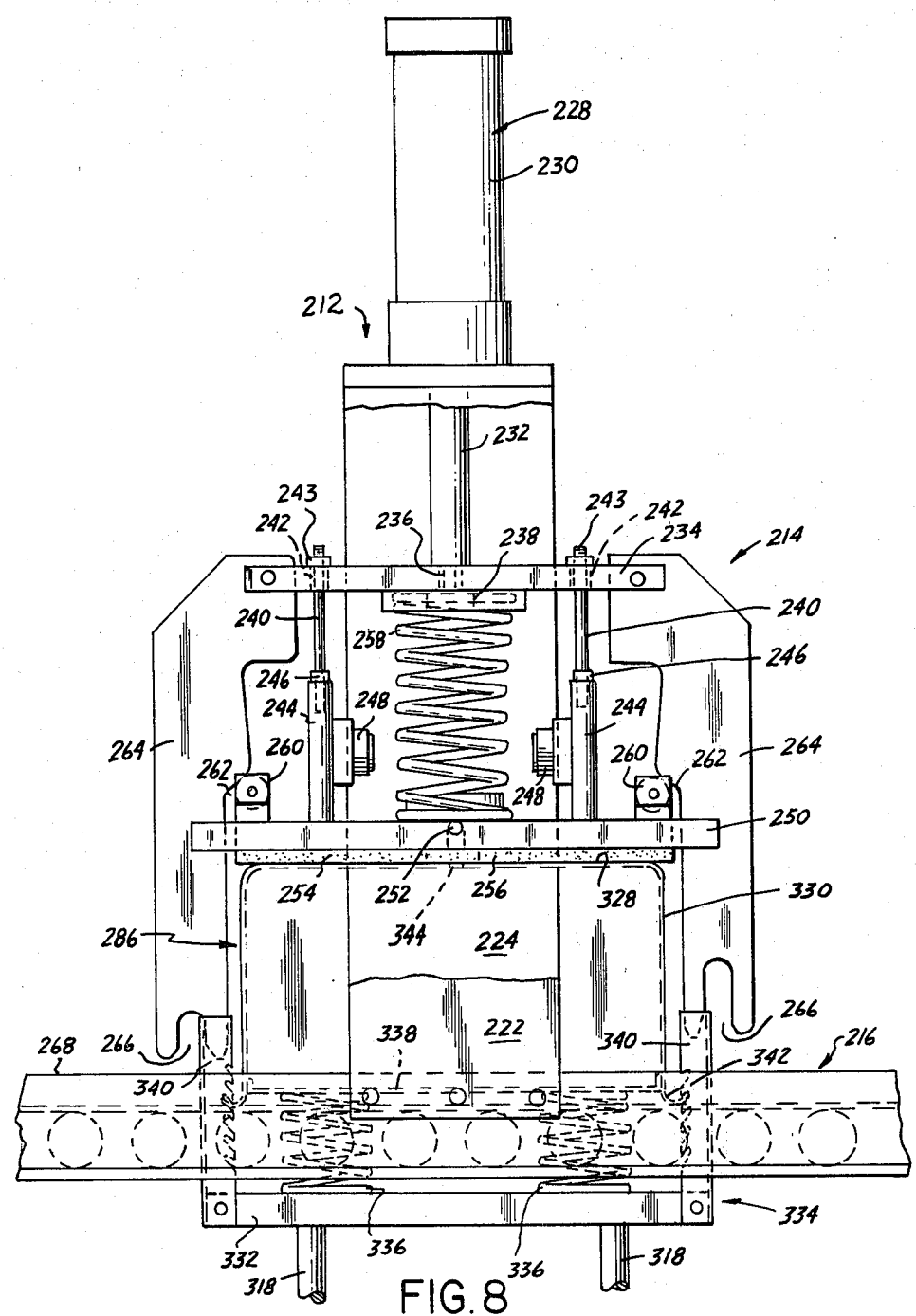
FIG. 8 is a side elevational view of the mold opening mechanism of FIG. 3, the mold opening mechanism being shown partly broken away and at a different operating stage from the operating stage illustrated in FIGS. 3 and 4.

A Hoy-type mold 110 is illustrated in FIG. 2. The mold 110 includes a body section 112 having a pair of end walls 114 and a pair of side walls 116. A bottom wall 118 cooperates with the end walls 114 and the side walls 116 to form a cavity 120 adapted to receive a product, such as a piece of ham, to be processed. Each of the end walls 114 is provided with a tubular socket 122. A hole (not shown) in the bottom wall 118 communicates with the cavity 120.

The mold 110 also includes a closure section 124 which has a lid 126 sized and shaped to fit within the cavity 120 of the body section 112. A bracket 128 is fixedly attached to the lid 126. Each end of the bracket 128 is provided with a slot 130 for receiving a looped end 132 of a coil spring 134, which has an opposite hooked end 136 adapted to releasably engage the lower end of a corresponding one of the tubular sockets 122 provided on the body section 112. Pins 138 carried by the bracket 128 are adapted to be removably received in the upper ends of the tubular sockets 122.

C. The Adelman-Type Embodiment of the Present Invention

Apparatus 210 illustrated in FIGS. 3-9 is especially suited for opening Adelman-type molds and includes five basic subassemblies. These subassemblies are a superstructure 212, a releasing mechanism 214, a conveyor 216, a base 218, and an ejector gate 220. Unless otherwise indicated hereinafter, the various elements of these subassemblies are made from stainless steel.

The superstructure 212 includes a pair of vertical support members 222, 224, the members extending upwardly from opposite sides of the conveyor 216. A mounting plate 226 bridges the vertical support members 222, 224 and carries a pneumatic ram 228, which includes a cylinder 230 and a piston rod 232 mounted for reciprocating movement into and out of the cylinder 230.

The releasing mechanism 214 includes a tie bar 234 which has a hole 236 for receiving the piston rod 232 of the pneumatic ram 228. A jam nut 238 positively attaches the tie bar 234 to the piston rod 232 of the pneumatic ram 228. Four guide rods 240 are slidably received in four holes 242 provided in the tie bar 234. Each of the guide rods 240 is provided with a nut 243, which functions as a stop to limit the upward movement of the tie bar 234 relative to the guide rods 240. The lower end of each of the guide rods 240 is threadedly received in a corresponding one of two support plates 244 and secured positively thereto by a nut 246. Each of the support plates 244 carries a pair of guide rollers 248 adapted to roll along the vertical support members 222, 224 of the superstructure 212. The support plates 244 also cooperate with each other to support a contact plate 250, having a port 252 which passes through the contact plate 250 from its upper surface to its lower surface and communicates with a source of pressurized air (not shown). A neoprene gasket 254 is attached to the lower surface of the contact plate 250. A hole 256 in the gasket 254 communicates with the port 252 of the contact plate 250. A coil spring 258 is interposed between the contact plate 250 of the tie bar 234 for the purpose of urging the tie bar 234 against the nuts 243. A pair of rotatable cam followers 260 extends upwardly from the contact plate 250. Each of the cam followers 260 is adapted to roll along a cam surface 262 provided on a corresponding one of two release arms 264, which are pivotally attached to opposite ends of the tie bar 234. The lower end of each of the release arms 264 is provided with a slot 266, one of the slots being longer than the other slot.

The conveyor 216 is formed from a pair of rails 268. Each of the rails 268 is provided with a drive sprocket 270, a plurality of idler sprockets 272, and an endless chain 274 entrained about the drive sprocket 270 and the idler sprockets 272. The endless chains 274 are designed to transport inverted Adelman-type molds along the conveyor 216 in the direction of the arrow 276. Another endless chain 278 links one of the drive sprockets 270 to a sprocket 280 fixedly attached to an output shaft (not shown) of an electric motor 282 designed to drive the endless chain 278 and, hence, the endless chains 274. The motor 280 is provided with a clutch (not shown) adapted to selectively engage and disengage the sprocket 280 and the endless chains 278, thereby controlling the movement of the endless chain 278 and, hence, the endless chains 274. Retractable stops 282, 284 are carried by one of the rails 268 of the conveyor 216. The stop 282 defines a mold opening and emptying position, which is occupied by a mold 286, while the stop 284 defines a standby position, which is occuppied by a mold 288. The supply end of the conveyor 216, which includes a loading ramp 289, is supported by a pair of legs 290. The discharge end of the conveyor 216 is supported by the base 218 at a lower elevation than the supply end, so that the conveyor 216 is inclined to facilitate transportation of the molds 286, 288 by the endless chains 274. Alternatively, the conveyor 216 can be arranged horizontally.

The base 218, which supports the discharge end of the conveyor 216, includes a pair of front legs 292 and a pair of rear legs 294. The front legs 292 are slightly shorter than the rear legs 294 to compensate for the incline of the conveyor 216. Bearing blocks 296 and mounting brackets 298 span the front legs 292 and the rear legs 298. One of the mounting brackets 298 carries a light source 300, the other mounting bracket 298 carrying a photoelectric cell 302 which senses light emitted from the light source 300 and generates a signal in response thereto.

The ejector gate 220 is pivotally attached to the base 218 by an axle 304 which is journalled in the bearing blocks 296 of the base 218. The ejector gate 220 includes a pair of side plates 306. A mold lid receiving deck 308, a product receiving deck 310 and a cross member 312 all span the side plates 306. The mold lid receiving deck 308 carries two pneumatic rams 314 which are mounted to the lower surface of the mold lid receiving deck 308. Each of the pneumatic rams 314 includes a cylinder 316 and a piston rod 318 (see FIG. 8) mounted for reciprocating movement into and out of the cylinder 316. In its extended position, each of the piston rods 318 extends upwardly beyond the upper surface of the mold lid receiving deck 308 through a corresponding one of two holes 320 provided therein. Pivotal movement of the ejector gate 220 relative to the base 218 is achieved by a pneumatic ram 322, including a cylinder 324 pivotally mounted to a mounting plate 326 connected between one of the front legs 292 and one of the rear legs 294 of the base 218 and an extensible piston rod 327 pivotally mounted to the cross member 312 of the ejector gate 220.

In operation, the molds 286, 288 are inverted and positioned on the loading ramp 289 of the conveyor 216. The molds are then successively fed upside down along the conveyor 216 in the direction of the arrow 276. As the mold 286 approaches the mold opening and emptying station, a first limit switch (not shown) senses the leading edge of the mold 286 and causes the stop 282 to extend so as to restrict the forward travel of the mold 286. The first limit switch also causes the stop 284 to extend so as to restrict the forward travel of the mold 288.

When the stops 282, 284 are fully extended, they trip a second limit switch (not shown) to initiate the downward movement of the piston rod 232 of the pneumatic ram 228. A speed control is built into the pneumatic ram 228 to effect the slow, continuous downward movement of the piston rod 232. The downward movement of the piston rod 232 continues until the gasket 254 is pressed into sealing engagement with a bottom wall 328 of a body section 330 of the mold 286, at which time a third limit switch (not shown) is tripped causing the piston rods 318 of the pneumatic rams 314 carried by the ejector gate 220 to extend upwardly very rapidly until they engage a bracket 332 of a closure section 334 of the mold 286, thereby compressing a pair of springs 336 interposed between the bracket 332 and a lid 338 of the closure section 334 (see FIG. 8). By compressing the springs 336, tension is relieved from ratchets 340 which hold the closure section 334 to the body section 330.

Figure 9:
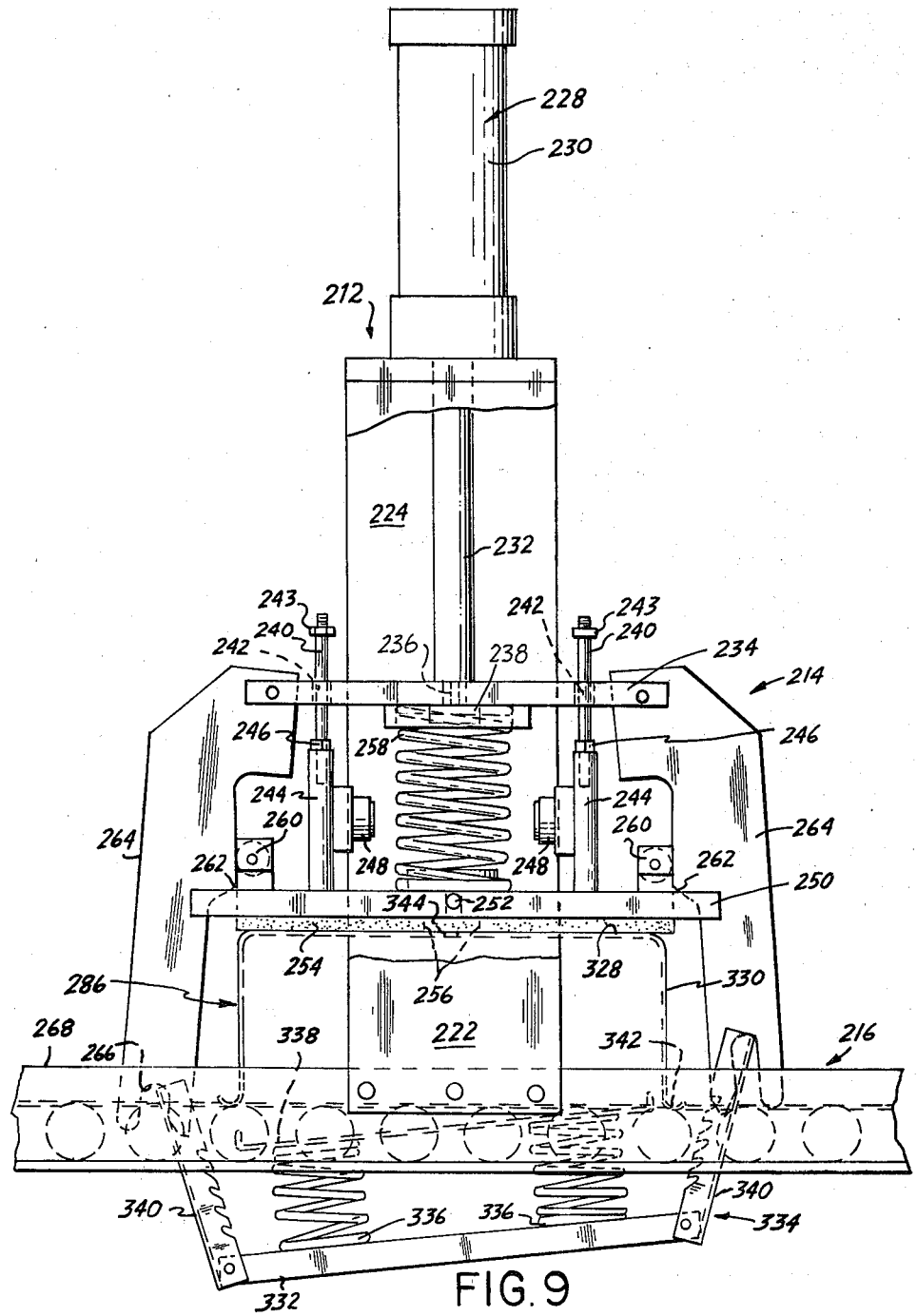
FIG. 9 is a side elevational view of the mold opening mechanism of FIG. 3, the mold-opening mechanism being shown partly broken away and at a different operating stage from the operating stages illustrated in FIGS. 4 and 8.

While the gasket 254 is resting on the bottom wall 328 of the mold 286, the piston rod 232 of the pneumatic ram 228 continues its downward movement, thereby moving the tie bar 234 downward relative to the contact plate 250 and compressing the spring 258 positioned between the tie bar 234 and the contact plate 250 (see FIG. 9). The relative movement of the tie bar 234 and the contact plate 250 causes the cam followers 260 attached to the contact plate 250 to roll along the cam surfaces 262 of the releasing arms 264, resulting in the pivotal movement of the releasing arms 264. This pivotal movement of the releasing arms 264 causes them to spread apart and disengage the ratchets 340 from a curled rim 342 of the body section 330 of the mold 286. The releasing arms 264 are designed to trap the ratchets 340. With the ratchets 340 now released but still trapped by the releasing arms 264, the piston rods 318 of the pneumatic rams 314 carried by the ejector gate 220 retract in response to a signal generated by a fourth limit switch (not shown) as it is tripped by the releasing arms 264. As the piston rod 232 of the pneumatic ram 228 continues its downward travel, the releasing arms 264, by reason of the difference in the lengths of the slots 266, hold the ratchets 340 such that one ratchet is held higher than the other so as to push one end of the closure section 334 off of the body section 330 before the other end of the closure section 334 is pushed off of the body section 330, thereby facilitating the removal of the closure section 334 from the body section 330 by making it easier to overcome the suction holding the sections together.

When both ends of the closure section 334 have been removed from the body section 330, the closure section 334 falls onto the mold lid receiving deck 308 of the ejector gate 220. As the closure section 334 falls onto the mold lid receiving deck 308, the beam of light emitted from the light source 300 is broken, causing the piston rod 326 of the pneumatic ram 322 which controls the position of the ejector gate 220 to retract and pivot the ejector gate 220 in a counterclockwise direction so as to eject the closure section 334 from one side of the apparatus 210 and position the product receiving deck 310 directly below the mold opening and emptying station.

The pivoting of the ejector gate 220 trips a fifth limit switch (not shown) causing a blast of air to be injected into the body section 330 of the mold through the port 252 in the contact plate 250, the hole 256 in the gasket 254, and a hole 344 in the bottom wall 328 of the body section 330 of the mold 286. This air blast is sufficient to overcome the suction holding the product in the mold and thus to allow the product to drop onto the product receiving deck 310 of the ejector gate 210. The ejected product breaks the beam of light emitted from the light source 300 causing the photoelectric cell 302 to generate a signal which initiates the extension of the piston rod 326 of the pneumatic ram 322 and thus the clockwise pivotal movement of the ejector gate 220 to discharge the product from an opposite side of the apparatus 210 and reposition the mold lid receiving deck 308 directly below the mold opening and emptying station.

With the ejector gate 220 positioned with its mold lid receiving deck 308 directly underneath the mold opening and emptying station, a sixth limit switch (not shown), which is activated in response to the movement of the ejector gate 220, causes the retraction of the stops 282, 284 and the piston rod 232 of the pneumatic ram 228. Upon reengagement of the sprocket 280 and the endless chain 278, the empty body section 330 of the mold 286 is transported away from the mold opening and emptying station, while the mold 288 is supplied to the mold opening and emptying station from the standby station. The same mold opening and emptying operations are then performed on the mold 288.

D. The Hoy-Type Embodiment of the Present Invention

Except for its superstructure 410 and its releasing mechanism 412, the five basic subassemblies of the Hoy-type embodiment are essentially identical to the five basic subassemblies of the Adelman-type embodiment. Therefore, of the five basic subassemblies of the Hoy-type embodiment only the superstructure 410 and the releasing mechanism 412 will be described with reference to FIGS. 10-13.

As shown in FIGS. 10-13, the superstructure 410 of the Hoy-type embodiment includes eight vertical support members 414 which extend upwardly from a conveyor 416. A mounting plate 418 bridges the vertical support members 414 and carries a pin releasing pneumatic ram 420 and a pair of spring releasing pneumatic rams 422. The pin releasing pneumatic ram 420 includes a cylinder 424 and a piston rod 426 which is mounted for reciprocating movement into and out of the cylinder 424. Each of the spring releasing pneumatic rams 422 includes a cylinder 428 and a piston rod 430 (see FIGS. 12 and 13) which is mounted for reciprocating movement into and out of the cylinder 428. The spring releasing pneumatic rams 422 are hooked in tandem so that the piston rods 430 extend and retract in synchronization with each other.

The releasing mechanism 412 includes a connecting plate 432 having a hole 434 therethrough for receiving the piston rod 426 of the lid releasing pneumatic ram 420, which is secured to the connecting plate 432 by a jam nut 436. Standoffs 438 connect the connecting plate 432 to a contact plate 440, the lower surface of which is provided with a neoprene gasket 442. A port 444 passes through the contact plate 440 from its upper surface to its lower surface. The gasket 442 is provided with a hole 446 which communicates with the port 444 of the contact plate 440. The contact plate 440 is also provided with a pair of holes 448, each of which slidably receives a corresponding one of a pair of guide pins 450 depending from the mounting plate 418 of the superstructure 410. Each end of the contact plate 440 is provided with a push off pin 452, which passes through a hole 453 in the contact plate 440. Each of the push off pins 452 includes a washer 454 fixedly attached to the push off pins 452, a neoprene grommet 456 sandwiched between the washer 454 and the lower surface of the contact plate 440 and a nut 458. By this construction, the push off pins 452 are permitted to pivot slightly relative to the contact plate 440.

Each of the piston rods 430 of the spring releasing pneumatic rams 422 is threadedly received in a corresponding one of two carriages 460 mounted for reciprocating movement along guide rods 462 depending from the mounting plate 418 of the superstructure 410. Each of the carriages 460 has a spring stretcher 463 pivotally attached thereto, the spring stretcher 463 including a spring stretching rod 464 and a Y-shaped yoke 466 adapted to receive and move along a guide rod 468 which depends from the mounting plate 418 of the superstructure 410. The guide rods 468 carry transverse trip pins 470 which function as stops to limit the downward movement of the yokes 466, resulting in the pivotal movement of the spring stretching rods 464 relative to the carriages 460 (see FIGS. 12 and 13).

Figure 10:
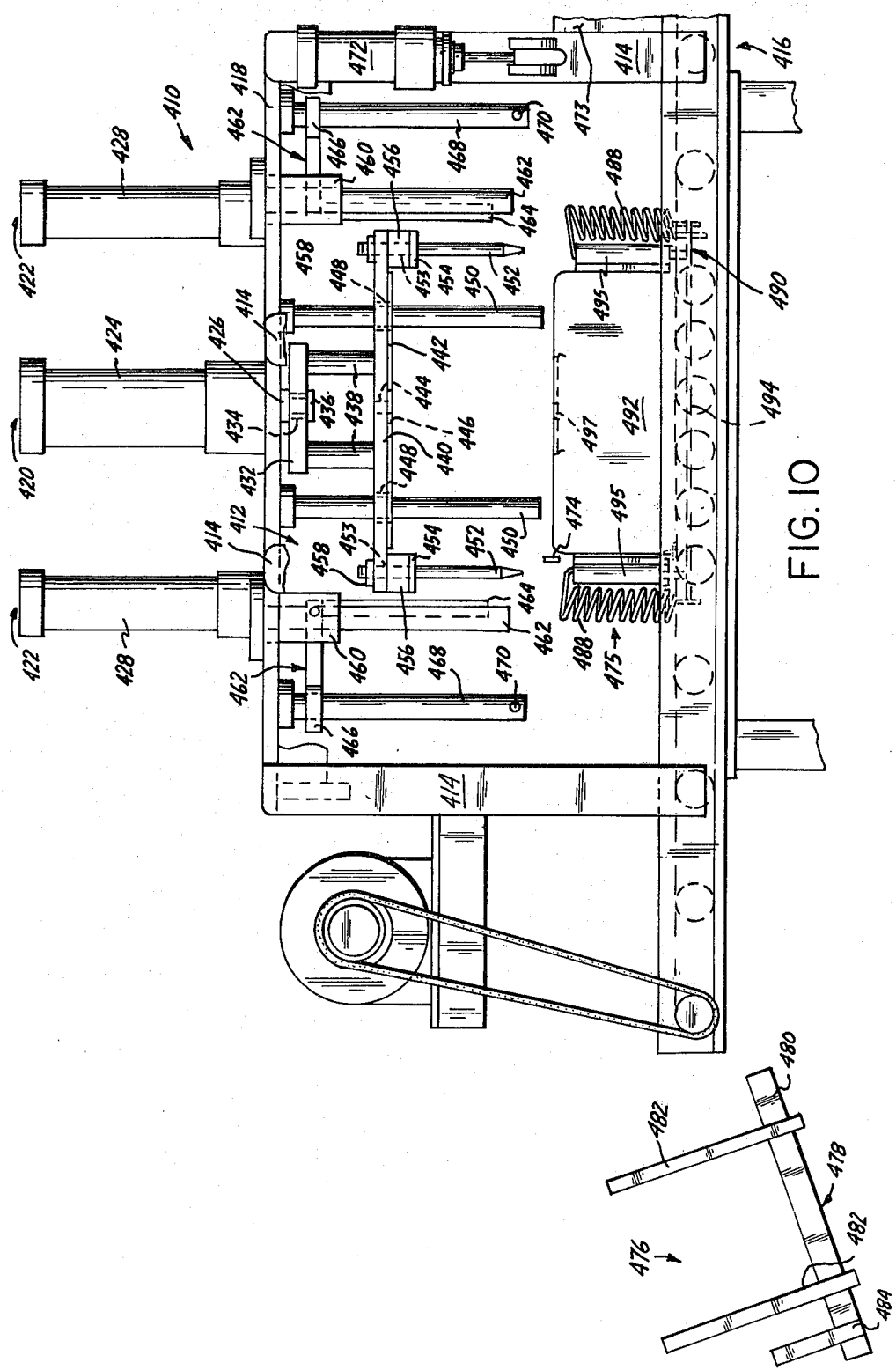
FIG. 10 is a side elevational view showing a mold opening mechanism of another embodiment of the present invention which is designed to open Hoy-type molds, portions of the mold opening mechanism being broken away to facilitate consideration and discussion.
Figure 11:
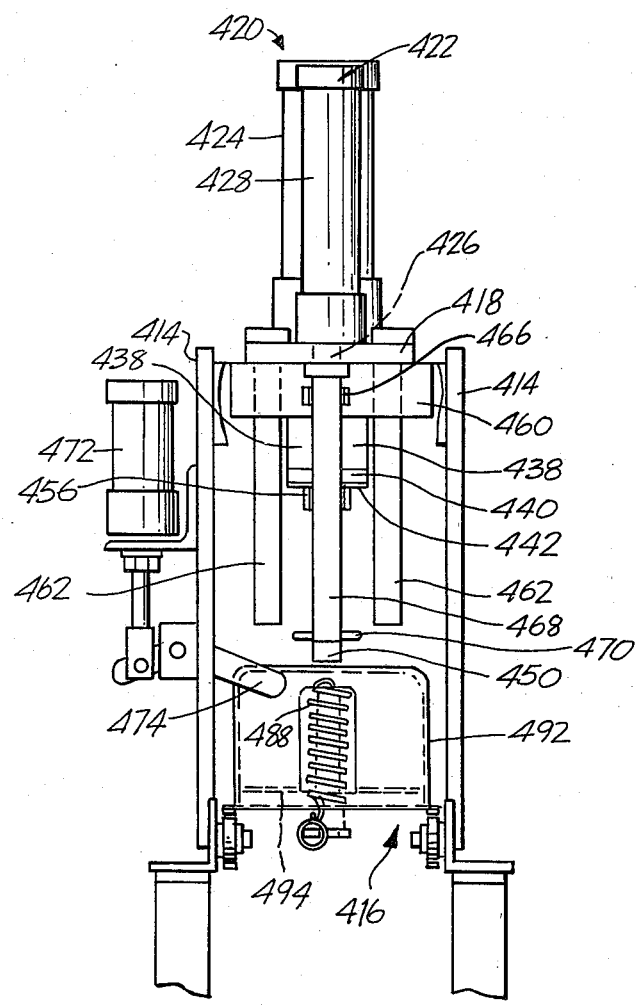
FIG. 11 is a rear elevational view of the mold opening mechanism illustrated in FIG. 10, a portion of the mold opening mechanism being broken away to facilitate consideration and discussion.
Figure 12:
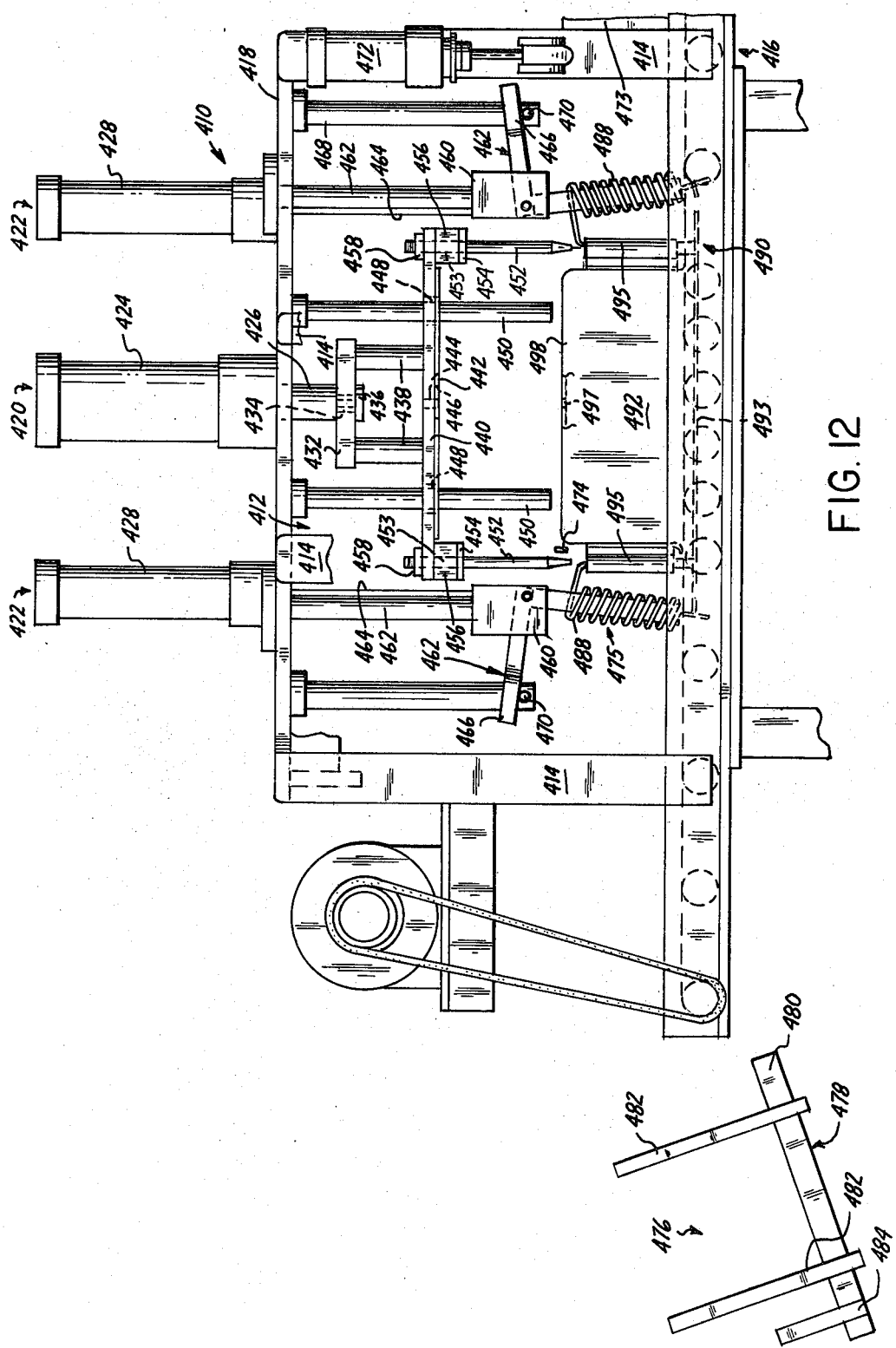
FIG. 12 is a side elevational view of the mold opening mechanism of FIG. 10, the mold opening mechanism being shown partly broken away and at a different operating stage from the operating stage illustrated in FIG. 10.

A pneumatically operated stop 472 is provided on one of the vertical support members 414 to define a mold standby position, which is occupied by a mold 473. Another pneumatically operated stop 474 (only a portion of which is shown in FIGS. 10, 12 and 13) carried by another one of the vertical support members 414 defines a mold opening and emptying station, which is occupied by a mold 475.

In addition to the five basic subassemblies employed in connection with the Adelman-type embodiment of the present invention, the Hoy-type embodiment also utilizes another subassembly, i.e., a spring ejecting mechanism 476. The spring ejecting mechanism 476 includes a laterally pivotable inclined chute 478 provided with teflon rails 480, retarding fingers 482 and a stationary stop 484.

In operation, as the mold 475 approaches the releasing mechanism 412 on the conveyor 416, a first limit switch senses the leading edge of the mold 475 and causes the stops 472 and 474 to extend, whereby the mold 475 is positioned at the mold opening and emptying station while the mold 473 is maintained at the mold standby position. As the mold 475 arrives at the mold opening and emptying station, a second limit switch is tripped, causing the piston rods 430 of the spring releasing pneumatic rams 422 to be extended. The carriages 460 move conjointly with the piston rods 430. Thus, as both of the piston rods 430 of the spring releasing pneumatic rams 422 extend downwardly, the spring stretching rods 464 attached to the carriages 460 are inserted into two springs 488 which hold a closure section 490 of the mold 475 to a body section 492. The spring stretching rods 464 stretch the springs 488 sufficiently so that they may be pivoted out of engagement with a bracket 494 carried by the closure section 490. The pivotal movement of the spring stretching rods 464 and hence the springs 488 is accomplished as the yokes 466 contact the trip pins 470 on the guide rods 468 during the continued downward movement of the carriages 460.

The piston rod 426 of the pin releasing pneumatic ram 420 commences its downward travel after the commencement of the downward travel of the piston rods 430 of the spring releasing pneumatic rams 422. Speed controls on the pin releasing pneumatic ram 420 and the spring releasing pneumatic rams 422 allow the piston rod 426 of the pin releasing pneumatic ram 420 to extend at a slower rate than the piston rods 430 of the spring releasing pneumatic rams 422. When the piston rods 430 of the spring releasing pneumatic rams 422 are extended to their limit, they trip a third limit switch which functions to stop the conveyor 416 in the manner described above. As the piston rod 426 of the pin releasing pneumatic ram 420 continues its downward movement, the push off pins 452 carried by the contact plate 440 push the closure section 490 off of the body section 442 by entering tubular sockets 495 provided on the body section 492 and engaging pins 496 (see FIGS. 12 and 13) attached to the closure section 490 and removably received in the tubular sockets 495. The closure section 490 then falls onto an ejector gate (not shown).

After ejection of the closure section 490 from the ejector gate in the manner described above, a fourth limit switch (not shown) is tripped by the pivotal movement of the ejector gate, causing a blast of air to be ejected into the body section 492 through the port 444 in the contact plate 440, the hole 446 in the gasket 442 and a hole 497 in a bottom wall 498 of the body section 492. This blast of air is sufficient to overcome the suction holding the product in the body section 492 and to allow the product to drop onto the ejector gate, which has been positioned in its product receiving position.

After ejection of the product by the ejector gate in the manner described above, a fifth limit switch (not shown) causes the simultaneous retraction of the piston rods 430 of the spring releasing pneumatic rams 422 and the piston rod 426 of the pin releasing pneumatic ram 420. Also, the fifth limit switch causes the stop 474 to disengage the empty body section 492 of the mold 475 as the conveyor 416 is restarted to transport the empty body section 492 away from the opening and emptying station. The stop 482 is simultaneously disengaged from the mold 473, so that it can be transported to the mold opening and emptying station from the mold standby station.

The empty body section 492 of the mold 475 is fed by the conveyor 416 to the spring ejecting mechanism 476. As the body section 492 travels down the rails 480, the retarding fingers 482 slow down the body section 492 of the mold 486 before it engages the stationary stop 484. This is necessary to reduce the impact of the body section 492 as it contacts the stationary stop 484, thereby preventing the springs 488 from being jarred off of the body section 492 as it contacts the stationary stop 484. The chute 478 is then pivoted until the springs 488 fall off of the body section 492 of the mold 475. With the springs 488 removed, the empty body section 492 slides off of the chute 478. The chute 478 is then pivoted back to its original position to await the reception of the empty body section of the mold 473.

What I claim is:

1. Apparatus for opening a mold which includes a body section, having an opening and a curled rim, and a closure section, having a lid removably applied to the opening of the body section, a crossbar resiliently urged away from the lid, a first ratchet hingedly connected to the crossbar so as to releasably engage the rim of the body section when the lid of the closure section is applied to the opening of the body section and a second ratchet hingedly connected to the crossbar so as to releasably engage the rim of the body section when the lid of the closure section is applied to the opening of the body section, said apparatus comprising arranging means for arranging the mold such that the body section is above the closure section during the opening of the mold; urging means for urging the crossbar of the closure section towards the lid of the closure section; first pivoting means for automatically pivoting the first ratchet of the closure section out of engagement with the rim of the body section when the crossbar is urged towards the lid by said urging means; second pivoting means for automatically pivoting the second ratchet of the closure section out of engagement with the rim of the body section when the crossbar is urged towards the lid by said urging means; first pushing means for pushing a first end of the closure section away from the body section after the first and second ratchets are disengaged from the rim of the body section; second pushing means for pushing a second end of the closure section away from the body section after the first and second ratchets are disengaged from the rim of the body section and after the first end of the closure section is pushed away from the body section; ejecting means for ejecting an article from the body section after the closure section has been pushed away from the body section by said first and second pushing means; catching means movable between a first position in which said catching means catches the closure section after the closure section has been pushed away from the body section by said first and second pushing means and in which said catching means discharges therefrom an article ejected from a previously opened mold and a second position in which said catching means catches the article ejected from the body section by said ejecting means and in which said catching means discharges the closure section caught by said catching means when said catching means was in said first position; and moving means for moving said catching means between said first and second positions.

2. The apparatus of claim 1, further comprising detecting means for detecting the presence of said closure section in said catching means and generating a first signal in response to the presence of said closure section in said catching means and for detecting the presence of said article in said catching means and generating a second signal in response to the presence of said article in said catching means and controlling means for controlling said moving means such that said moving means moves said catching means in a first rotational direction from said first position to said second position in response to the generation of said first signal by said detecting means and such that said moving means moves said catching means in a second rotational direction, which is opposite to said first rotational direction, from said second position to said first position in response to the generation of said second signal by said detecting means.

3. The apparatus of claim 2, wherein said ejecting means includes a jet of air.

4. The apparatus of claim 3, further comprising inhibiting means for inhibiting the upward movement of said body section during the urging of said crossbar towards said lid by said urging means.

5. The apparatus of claim 4, wherein said preventing means includes a movable plate and moving means for moving said plate into engagement with said body section.

6. The apparatus of claim 5, wherein said plate includes discharging means for discharging said blast of air into said body section.

7. The apparatus of claim 6, wherein said urging means includes an extensible member carried by said catching means.

8. Apparatus for opening a mold which includes a body section, having an opening and first and second coil springs releasably attached to the body section, and a closure section, having a lid removably applied to the opening of the body section and first and second retainers which releasably engage the first and second coil springs, respectively, when the lid of the closure section is removably applied to the opening of the body section, said apparatus comprising arranging means for arranging the body section above the closure section during the opening of the mold; pivoting means for automatically pivoting the first and second coil springs out of engagement with the first and second retainers, respectively; first pushing means for pushing a first end of the closure section away from the body section after the first and second coils springs are disengaged from the first and second retainers, respectively; second pushing means for pushing a second end of the closure section away from the body section after the first and second coil springs are disengaged from the first and second retainers, respectively, and after the first end of the closure section is pushed away from the body section; ejecting means for ejecting an article from the body section after the closure section has been pushed away from the body section by said first and second pushing means; catching means movable between a first position in which said catching means catches the closure section after the closure section has been pushed away from the body section by said first and second pushing means and in which said catching means discharges therefrom an article ejected from a previously opened mold and a second position in which said catching means catches the article ejected from the body section by said ejecting means and in which said catching means discharges the closure section caught by said catching means when said catching means was in said first position; and moving means for moving said catching means between said first and second positions.

9. The apparatus of claim 8, further comprising detecting means for detecting the presence of said closure section in said catching means and generating a first signal in response to the presence of said closure section in said catching means and for detecting the presence of said article in said catching means and generating a second signal in response to the presence of said article in said catching means and controlling means for controlling said moving means such that said moving means moves said catching means in a first rotational direction from said first position to said second position in response to the generation of said first signal by said detecting means and such that said moving means moves said catching means in a second rotational direction, which is opposite to said first rotational direction, from said second position to said first position in response to the generation of said second signal by said detecting means.

10. The apparatus of claim 9, wherein said ejecting means includes a jet of air.

11. The apparatus of claim 10, further comprising removing means for removing said first and second coil springs from said body section.

* * * * *